United States Patent [19]

Johnson et al.

[11] Patent Number: 4,987,538
[45] Date of Patent: Jan. 22, 1991

[54] AUTOMATED PROCESSING OF PROVIDER BILLINGS

[75] Inventors: Danny L. Johnson; John R. Sollman, both of Silverton; Larry A. Harker, Salem, all of Oreg.

[73] Assignee: Western Medical Consultants, Portland, Oreg.

[21] Appl. No.: 344,768

[22] Filed: Apr. 27, 1989

[51] Int. Cl.$^5$ ............................................. G06F 15/22
[52] U.S. Cl. ...................................... 364/401; 364/406; 364/972.3; 364/922.1; 364/274.5; 364/413.01; 364/200; 364/900
[58] Field of Search ................ 364/406, 408, 513, 401, 364/413.01, 200 MS File, 900 MS File

[56] References Cited

U.S. PATENT DOCUMENTS

| | | | |
|---|---|---|---|
| 4,491,725 | 1/1985 | Pritchard | 364/406 X |
| 4,700,297 | 10/1987 | Hagel, Sr. et al. | 364/408 |
| 4,858,121 | 8/1989 | Barber et al. | 364/406 |
| 4,866,634 | 9/1989 | Reboh et al. | 364/408 X |

OTHER PUBLICATIONS

"Comptrak" brochure, Weyerhaeuser Information Systems.
Spilberg, "One Giant Step for Insurers", Best's Review Propl/Casualty, vol. 87, Issue 1, May 1988, pp. 54-60, 110.
Van Horn, "Understanding Expert Systems", Bantam Books ©1986 pp. 89-92, 127-131, 164-166.
Waterman, "A Guide to Expert Systems", Addison Wesley Publishing ©1986 pp. 16-21, 63-67, 152-153.

Primary Examiner—Jerry Smith
Assistant Examiner—Steven G. Kibby
Attorney, Agent, or Firm—Robert L. Harrington

[57] ABSTRACT

The inclusion of computer capability to process Workers' Compensation claims wherein a complexity of administrative rules determine maximum allowable benefits, the processing of which is not feasible for manual processing. The rules are converted to computer computations entered into the computer's memory. A computer process is devised to systematically examine the rules as they apply to a specific billing. In particular, the various modifiers that affect the allowable pay out are determined through this computer processing. Prestored information on prior billings for the same injury is considered for further modification of the allowable billing amount.

6 Claims, 2 Drawing Sheets

AUTOMATED PROCESSING OF PROVIDER BILLINGS

FIELD OF THE INVENTION

This invention relates to a method for processing provider billings under insurance claims where determination of maximum allowable pay out for a provider billing is controlled by a detailed and complex array of administrative rules.

BACKGROUND OF THE INVENTION

This invention has particular application to medical billings made against Workers' Compensation Insurance. Injuries and/or illnesses that occur on the job and are job related (hereafter collectively referred to as injuries) are typically covered under state sponsored Workers' Compensation Insurance. Professional persons, e.g. physicians, chiropractors, etc. (hereafter collectively referred to as providers) who treat such injured persons are required to abide by a set of administrative rules derived specifically to maintain control over costs under Workers' Compensation Insurance benefits.

The rules necessarily deal with all the different types of services provided and the many variables or complications that may develop with any one injury occurrence, which may comprise a combination of injuries. The rules are intended to be all encompassing and adaptable to varying conditions. For example, the rules recognize that more than one doctor may beneficially participate in an operation. On the other hand, only one operating room will be used, one set of attendants, etc. Also, one doctor will more than likely provide follow-up examinations. Thus, as compared to a similar surgery performed by one doctor, the acceptable charges are different and they are not simply doubled just because two doctors are in attendance.

The above is but a very simple example of how the rules vary for determining payment on billings filed against Workers+ Compensation Insurance. Heretofore billings submitted by professional providers (e.g. physicians) for Workers+ Compensation Insurance benefits (numbering in the dozens per day), were divided among insurance company employees who had the responsibility for the accuracy of those billings.

Literally hundreds of rules are applicable and should be considered when processing the billings. Whereas the administrative rules are provided in written form in rule books which are readily available, the first requirement for effectively processing a billing is to be able to recognize when an exception to a general or basic rule exists, and exceptions are frequent. To have to go digging through the rule books when an exception is even suspected creates a log jam of unprocessed billings or requires so many processors as to render the solution more painful than the problem.

Other problems can be cited but the unavoidable result was that due to the sheer complexity of the rules thousands of dollars were likely paid out daily in excess of the acceptable amount. This situation occurred without any question of integrity or competency. It was simply a product of expedience.

BRIEF DESCRIPTION OF THE INVENTION

The solution to the dilemma, i.e. of overpaying on provider billings is accomplished in the present invention by involving the absolute memory and speed of a computer. The hundreds or thousands of variables applicable under the administrative rules was itemized, organized and converted into codes adaptable for software programming. The software was then developed to enable the computer to receive certain basic information, i.e. identification of the claim (based on a prior approval of insurance coverage), the identification of the provider, the treatment that was administered, and such further information as may be considered pertinent, e.g. provider billing date, date of treatment, and the like. From that information a search is conducted through the network of rules in a manner organized to determine the applicable rules, and from the rules, a determination of the maximum allowable payment for the provider billing.

The above basic information is typically available from insurance billing forms prepared by the attending provider, e.g. a physician. The claim identification (which could consist of simply the patient name and date of injury) enables the computer to check its memory bank for other billings submitted for that same injury. This may or may not be pertinent as determined by the rules. The provider identification and the treatment provided enables the computer to determine that the provider is a qualified "professional" and what rules apply to the specific treatment provided. The rest is a matter of computation. Certain basic rules in combination determine the basic maximum allowable payment which is then modified by any modifying rules that are applicable.

The invention will be more clearly understood and appreciated by reference to the following detail disclosure and the drawings referred to therein.

An important first step that occurs is the qualification of the claimant. That is, the claimant is required to have an accepted claim for Workers' Compensation and the treatment provided must be for an accepted condition under that claim. Claim forms are filled out and submitted to the insurance company. If the claim is accepted, the status of acceptance and the assigned claim identification is input to the computer. Provider billings are qualified on the basis of the claim identification information and enables the computer to charge the billing against an approved claim.

Figure 1:
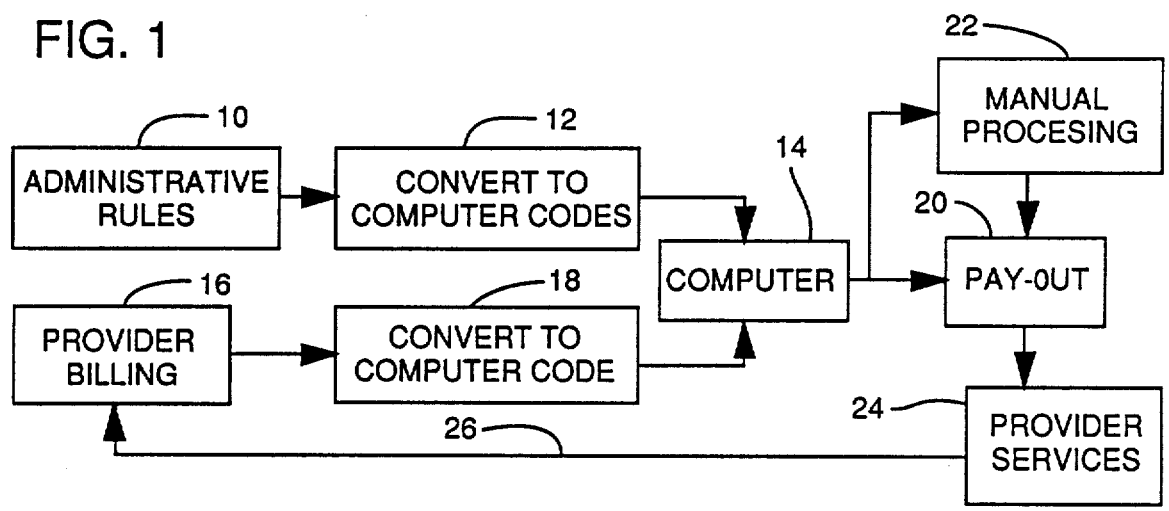
FIG. 1 is a flow diagram illustrating generally the process steps of a preferred embodiment of the invention.

Reference is now made to FIG. 1 of the drawings. There are two types of input that must be considered in order to determine the maximum allowable insurance benefits payable on a provider billing. The first input is the administrative rules 10. The administrative rules include a listing of all of the different types of treatment applicable to injury claims and the allowed payments for the treatments. Numerous qualifiers or modifiers are part of this "listing". Thus, a permitted payment may be increased if two doctors are in attendance, but payment to the second doctor may include a modifying factor that reduces payment to him. Many, many other factors are part of the administrative rules and taken together enable the billing processor to determine the maximum allowable payment. The problem, as previously explained, is that an individual billing processor is simply not capable of retaining all of the information and it is not feasible to extract the information from the written rules. In many if not most cases, doing the job "right" is simply too time consuming to be cost effective.

In accordance with the present invention, the administrative rules 10 are converted into rule codes 12 and stored in the memory of the computer 14. A software program enables the computer to select the appropriate rules and sequentially apply the rules to each specific billing.

Continuing with the reference to FIG. 1, the second type of input to the computer 14 is the provider billing 16. The information from the provider billing must be extracted and input to the computer as indicated in step 18. The information from the provider billing must be sufficient to enable the computer to accomplish multiple functions. The computer must be able to identify the claim and the provider of the treatment. It also must be able to identify the treatment provided and determine any factor which will effectively modify the basic pay out, e.g. whether one or two physicians were in attendance, etc.

Figure 2:
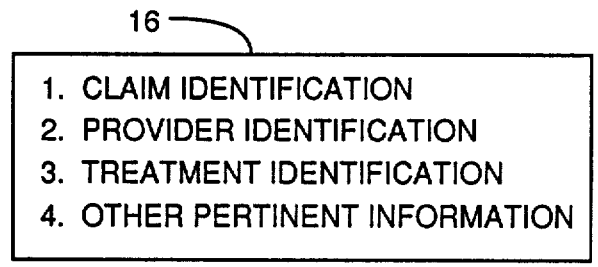
FIG. 2 illustrates the information from the provider billing to be input to the computer of FIG. 1.

From FIG. 2 the four basic information categories are claim identification, provider identification, treatment identification and "other pertinent information". The claim identification identifies the "claim accepted" status. The provider identification determines whether the provider is an authorized professional. The claim identification also enables the identification of prior provider billings and whether the processed billing is a repeat billing. Other pertinent information may include, e.g. the date of treatment for determining the timeliness of the billing, e.g. to establish penalties that may be applicable to late billing. The "other pertinent information" can also include adjustment factors such as increases due to difficulties encountered by complications, decreases due to treatment of peripheral injuries of a secondary nature, the participation of a physician as an assistant, and so on.

The amount of the provider's billing can also be considered as "other pertinent information". The rules will likely dictate the maximum allowable pay out. The provider's billing reflects what the provider considers a reasonable billing under the circumstances. It is not unusual for the provider billing to be less than the maximum allowable pay out. In this event, the actual pay out may be the lesser amount, i.e. the provider's billing amount.

The provider billing information is input into the computer as indicated at 18. The computer in general processes the billing by the application of the appropriate administrative rules 18 to the type of treatment provided, i.e. from the provider billing information 16. If the provider billing is sufficient and the computer is able to identify and apply the appropriate rules, the computer output will include a report and pay out authorization. The authorized pay out is the lesser amount of computed maximum pay out or actual billing. This report and authorization is indicated as step 20 in FIG. 1. The information of the pay out is also conveyed to the computer's memory as a "prior billing" for consideration in processing subsequent billings.

In the event that the computer is unable to process the billing due to abnormalities, the billing will be flagged and routed to a manual processing step 22. Assuming there is enough information to process the billing, payment is authorized. The alternative is, of course, to reject the billing and force resubmission of the provider billing. The pay out involves the simple step of making payment to the provider as the supplier of provider services 24.

From the above, it will be appreciated that essentially five steps are involved in the method of processing a provider billing under this invention. These five steps can be considered to be bracketed between the step of approving the claim (thereby establishing claim identification) and pay out. The five steps are herein referred to as; (a) the rules conversion step wherein the administrative rules are converted into "computable" terms; (b) the program generating step which inputs codes and processes that enable computer processing; (c) the provider billing input step which identifies a specific provider treatment for processing under the rules; (d) the rules identification step whereby the computer program determines which rules are applicable; and (e) the computing step which determines the maximum allowable pay out.

Examples of how the above five steps are actually implemented is provided below. These examples are based on the administrative rules that govern Workers' Compensation Insurance benefits for the State of Oregon. (OAR=Oregon Administrative Rules)

(a) The rules conversion step. Examples of three OAR sections are listed below followed by the computer code.

1. OAR 436-10-090(9) Physician assistants or nurse practitioners fees will be paid at the rate of 80 percent of a physician's fee for a comparable service except that assisting in surgery shall be paid at the rate of 50 percent of the comparable fee for a physician assisting in surgery.
   Relation: IF PHYS_TYPE = NP OR
   IF PHYS_TYPE = PA AND
   MOD = O OR NULL
   THEN ALLOW_CHG = .8 * (PHYS_RV * MCONV_FACT)
   ELSE IF PHYS_TYPE = NP OR
   IF PHYS_TYPE = PA AND
   MOD = 81
   THEN ALLOW_CHG - .1 * (PHYS_RV * MCONV_FACT)
   IF CHARGE>ALLOW_CHG
   THEN REDUCE BY EXCESS OVER ALLOW_CHG AND
   PRINT MESSAGE b
2. OAR 436-010-090(16)(c) When multiple surgical procedures are performed, the principal procedure is reimbursed at 100 percent of the maximum allowable fee, the secondary procedure is reimbursed at 50 percent of the maximum

```
-continued
allowable fee, and all subsequent procedures are
reimbursed at 25 percent of the maximum allowable fee.
Relation:
    IF CPT_CODE = 10000 -> 29799 OR
    IF CPT_CODE = 30000 -> 69999 AND
    IF CPT_CODE <> 23355 -> 23358 OR
    IF CPT_CODE <> 27373 -> 27379 OR
    IF CPT_CODE <> 27436 OR
    IF CPT_CODE <> 27490 OR
    IF CPT_CODE <> 27850 -> 27853 AND
    MOD = 51
    THEN ALLOW_CHG = .5 * (PHYS_RV * MCONV_FACT)
    ELSE IF CPT_CODE = 10000 -> 29799 OR
    IF CPT_CODE = 30000 -> 69999 AND
    IF CPT_CODE <> 23355 -> 23358 OR
    IF CPT_CODE <> 27373 -> 27379 OR
    IF CPT_CODE <> 27436 OR
    IF CPT_CODE <> 27490 OR
    IF CPT_CODE <> 27850 -> 27853 AND
    MOD = 53
    THEN ALLOW_CHG = .25 * (PHYS_RV * MCONV_FACT)
    THEN REDUCE BY EXCESS OVER ALLOW_CHG AND
    PRINT MESSAGE r
3  OAR 436-010-090(16)(d) When multiple arthroscopic
   procedures are performed, the major procedure shall be
   paid at no more than 100 percent of the value in the
   RVS, and the subsequent procedures paid at 10 percent
   of the value listed in the RVS.
    Relation: IF CPT_CODE = 23355 -> 23358 OR
              IF CPT_CODE = 27373 -> 27379 OR
              IF CPT_CODE = 27436 OR
              IF CPT_CODE = 27490 OR
              IF CPT_CODE = 27850 -> 27853 OR
              IF CPT_CODE = 29815 -> 29909 AND
              MOD = 51
              THEN ALLOW_CHG = .1 * (PHYS_RV * MCONV_FACT)
              THEN REDUCE BY EXCESS OVER ALLOW_CHG AND
              PRINT MESSAGE s
```

(b) The program generating step. This step is essentially the development of the computer logic. Providing the specifics of the logic would be voluminous and unnecessary. It would be meaningful only to a computer programmer. A computer programmer, given the information contained herein, will readily produce the "programming generating step". In laymen's terminology, this step involves the development of the source code and data base structure. Basically, the source code is a refinement of the logic statements given as examples for the "rules conversion step". The logic is put into proper syntax for the programming language being used, with proper beginning and ending markers for each conditional statement and subroutine. Utility routines are created to re-index and pack the data base as needed, and to make certain user-level modifications to the various parameters.

(c) The provider billing step. Inputting the data from the provider billing consists of identifying from the billing the applicable codes. The codes are industry standard codes adopted by authorized providers and utilized in the computer system. These codes (which provide the claim identification, provider identification, injury treatment identification, and "other pertinent information"), are input into the computer. The system operator then responds to any system prompt that results from the data entry. When the operator has determined that the data input is complete, the operator signals the system that it is ready to process the data.

(d) The rules identification step. The function of the rules identification step and the following computing steps are viewed by the computer process as an integral step. They are separated here for the purpose of reader understanding. In essence, the rules are identified in the system as a reaction to the input of the provider billing. For example, if a multiple surgical procedure is performed, the provider billing will identify the surgical procedure to be performed and qualify the entry as a multiple surgery, e.g. by inputting the code for modifier 51. This tells the system that the value of the second surgical procedure is 50 percent of the base allowable amount, unless the surgery is arthroscopy, in which case it is 10 percent.

(e) the computing step. The computing step is a compilation of computer steps and is exemplified in FIG. 3. These computer steps are as follows:

Identify information relating to provider billing as steps 16 and 18 (actually preliminary to computer processing but explained here for continuity).
1. Entry or generation of billing audit identification.
2. Identification of claim information:
   a. Paying agent;
   b. Claim number;
   c. Date of injury;
   d. Name/ID of claimant.
3. Identification of provider information.
Input of provider billing information as step 28 (also a preliminary step but explained for continuity).
1. Services provided.
2. Amount billed.
3. Other billing information.
Process billing information, steps 30–38.
1. Identify potential duplication of previous billings.
2. Search for applicable rules based on info entered.
3. Identify exceptions to rules.
4. Apply rules in order and compute presumed allowable amount.
5. Apply relevant modifiers.
6. Calculate final amount allowed for line item.
7. Compare amount billed with amount allowed.
8. Identify reduction.
Print billing audit report as step 40.

1. Print identifying information for billing.
2. Print treatment; amount billed, reduced and allowed.
3. Print applicable rules for all reductions.

Figure 3:
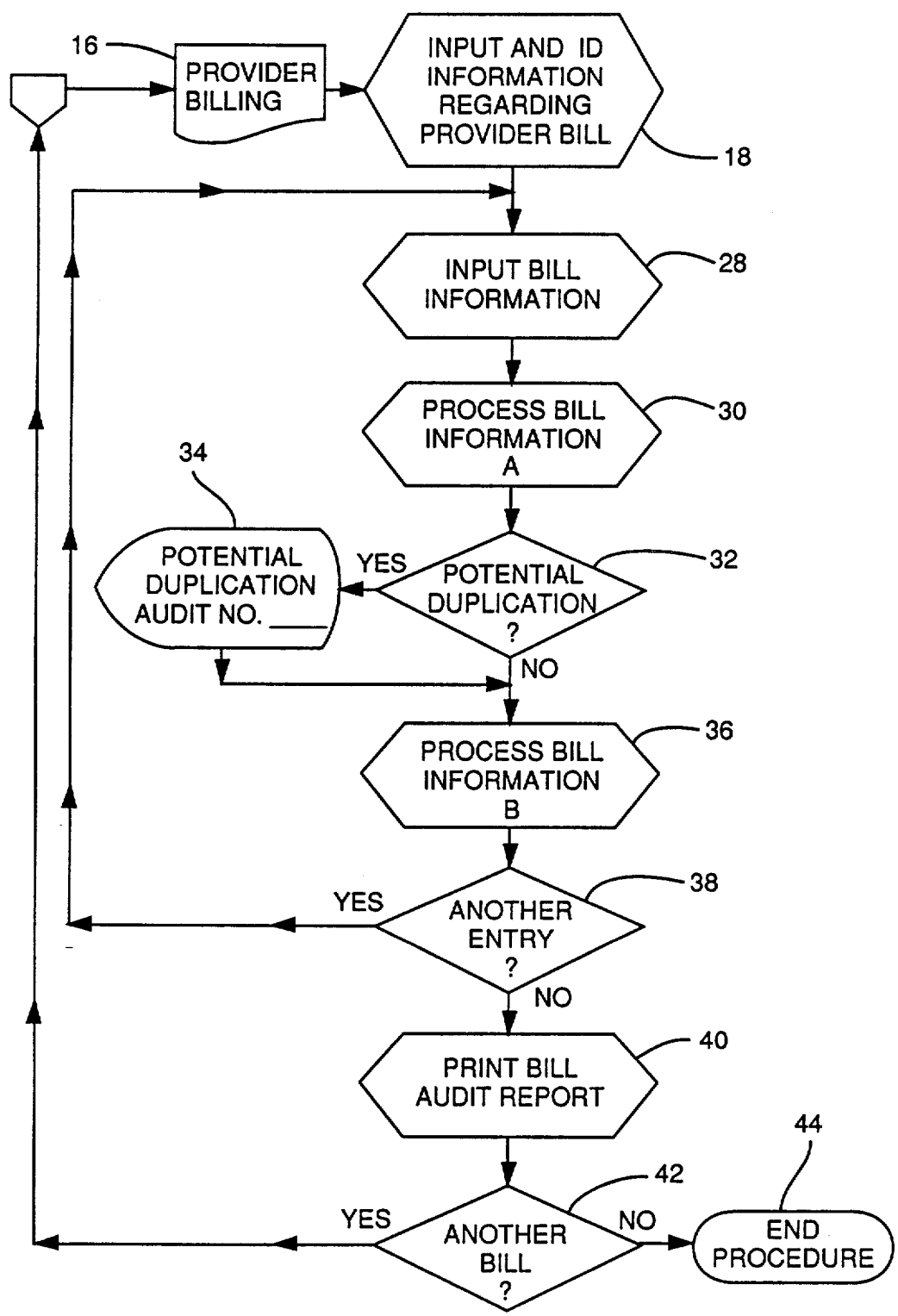
FIG. 3 illustrates the computer processing steps in applying the rules computations to the provider billing information for determining, e.g. maximum pay out.

The remainder of the system illustrated in FIG. 3 is the "repeat" initiating step 42 for processing another billing and the end procedure step 44 which is self-explanatory. The reader should understand that the Print Billing Audit Report enables pay out, i.e. generates output to facilitate timely and accurate payment of the provider billing. It should also be understood that the illustration of FIG. 3 is a one-level diagram only. Each octagonal figure on the diagram represents predefined processes which is the subject of supporting flow diagrams. Again the provision of this underlying data would be voluminous and unnecessary. A computer programmer having the information given above will readily produce this data.

The above explanation is exemplary of a process of the invention. The essence of the invention is the enablement of computer processing of provider billings, where such billings are controlled by an "uncontrollable" complexity of rules. In particular, the method or process of the invention of such complex rules to the processing of provider billings in a manner not feasible under the current practice of manual processing. As provided by the method, the applicable rules are coded and organized through software programming to provide for the appropriate selection and application of the pertinent rules.

The invention will have applications other than as specifically described. Accordingly, the scope of the invention is to be determined by the claims appended hereto.

What is claimed is:

1. A method for insurance company processing of provider billings for determining an allowable payment for services rendered by the provider to a member of a group of individuals insured by the insurance company, which method comprises;

identifying a complexity of rules including basic rules applicable to occurrences encountered by a member of the group generating a need for provider services, and further including rules modifying the basic rules applicable to variations in the services provided by the provider;

converting the rules into computer readable computable data;

generating a computer program including the data representing the rules and including process steps for scanning the data to determine applicability of the rules represented by the data, said program responsive to specific input codes representing a claim of a member of the group, a qualified provided and the services provided;

inputting the computer program into a computer;

receiving manually prepared provider billings having provided billing information including identification of a claim of a member, the provider, and the services rendered, and manually inputting that information to the computer in the form of said specific input codes; and computer processing the information by application of the computer program to thereby apply the rules to the provider billing information and determine from the information the allowable payment permitted by the rules.

2. A method as defined in claim 1 that further comprises;

manually inputting from the provider billing, the provider billing amount; and including in the computer processing step the determination of the difference between the provider billing amount and the allowable amount computed for the provider billing.

3. A method as defined in claim 2 including the further step of printing a billing audit report and including in the report a determination of any difference between the provider billing amount and the allowable payment permitted by the rules.

4. A method as defined in claim 3 wherein the billing audit report includes a recitation of the rules applied in generating the difference.

5. A method as defined in claim 1 wherein the computer processing step includes generating a history of prior provider billings processed, said program including the step of comparing a new billing with the history of prior billings and determining whether a provider billing is a duplication of a prior provider billing that has been processed.

6. A method as defined in claim 2 that further comprises inputting from the provider billing the data of provider services rendered and date of provider billing, and wherein said program includes determining penalties applicable for late billing.

* * * * *